United States Patent [19]

Watanabe

[11] 3,899,795

[45] Aug. 12, 1975

[54] CASETTE TAPE RECORDING AND/OR REPRODUCING APPARATUS HAVING MOLDED CHASSIS AND MOLDED HEAD CARRIAGE

[75] Inventor: Kunitake Watanabe, Tokyo, Japan

[73] Assignee: Sony Corporation, Tokyo, Japan

[22] Filed: May 21, 1973

[21] Appl. No.: 362,163

[30] Foreign Application Priority Data

May 22, 1972 Japan .............................. 47-59635

[52] U.S. Cl. ............ 360/137; 200/169 PB; 360/60; 360/96; 360/105

[51] Int. Cl.² ........................G11B 1/00; G11B 5/105; G11B 15/04; G11B 21/02

[58] Field of Search ........... 179/100.2 CA, 100.2 Z; 274/4 D, 4 A, 11 A; 317/2 R, 2 I; 200/5 E, 5 D, 159 R, 169 PB; 360/96, 105, 137, 60

[56] References Cited

UNITED STATES PATENTS

| | | | |
|---|---|---|---|
| 3,271,530 | 9/1966 | Wirsching | 200/169 PB |
| 3,517,140 | 6/1970 | Bailey et al. | 200/5 E |
| 3,721,765 | 3/1973 | Ho | 179/100.2 Z |
| 3,752,938 | 8/1973 | Ozawa | 179/100.2 Z |
| 3,778,564 | 12/1973 | Nocella | 200/5 E |

OTHER PUBLICATIONS

Chatto et al., "Electrostatic Reducing Tape Handling Devices," IBM Tech. Disc. Bull., Vol. 12, No. 10, March 1970, p. 1625.

*Primary Examiner*—Stanley M. Urynowicz, Jr.
*Assistant Examiner*—R. S. Tupper
*Attorney, Agent, or Firm*—Lewis H. Eslinger; Alvin Sinderbrand

[57] ABSTRACT

In a tape recording and/or reproducing apparatus having a tape driving mechanism that includes reel shafts for engagement with tape supply and take-up reels, a capstan and a motor for driving the reel shafts and capstan, and a magnetic head for selectively recording and/or reproducing signals on the tape as the latter is transported between the supply and take-up reels by means of the capstan; the main chassis on which the tape driving mechanism is mounted and the carriage which has at least said magnetic head fixed thereon and which is slidably mounted on the main chassis for selectively disposing the head in an operative position in respective of the tape between the supply and take-up reels, are molded of synthetic resins. Preferably, the synthetic resin of the molded main chassis is relatively resilient for absorbing impacts and shocks, while the synthetic resin of the molded carrage is relatively rigid to ensure the accurate positioning of the head relative to the tape in the operative position, and the molded main chassis and carriage may be reinforced with glass fibers to provide the requisite strengths.

19 Claims, 22 Drawing Figures

CASETTE TAPE RECORDING AND/OR REPRODUCING APPARATUS HAVING MOLDED CHASSIS AND MOLDED HEAD CARRIAGE

BACKGROUND OF THE INVENTION

1. Field of the Invention

This invention relates generally to tape recording and/or reproducing apparatus, and more particularly is directed to improvements in such apparatus of a type for recording and/or reproducing audio signals on a tape contained in a cassette.

2. Description of the Prior Art

In conventional apparatus of the above described type, the tape driving mechanism that includes reel shafts for engagement with tape supply and take-up reels, a capstan and a motor for driving the reel shafts and capstan is mounted on a main sheet metal chassis, and the magnetic head for selectively recording and/or reproducing signals on the tape as the latter is transported between the supply and take-up reels by means of the capstan is mounted on a metal carriage or head plate which is slidable relative to the main chassis for movement of the head to and from an operative position in respect of the tape extending between the supply and take-up reels within the cassette. In order to achieve proper recording and reproducing of signals on the tape within the cassette, it is necessary that the magnetic head be accurately located in respect of the tape when in its operative position. Therefore, the main chassis and the head plate or carriage slidable thereon must be designed and manufactured with very close tolerances and further constructed with sufficient strength and rigidity to maintain those close tolerances and the resultant accurate positioning of the head even when the apparatus is subjected to mechanical shocks or impacts which are unavoidable, particularly in the case of a portable apparatus.

When the main chassis and head plate or carriage are made of sheet metal, as in conventional apparatus of the described type, the following inherent disadvantages are encountered:

The metal chassis and head plate or carriage may corrode or rust, particularly when the apparatus is regularly used near the seashore or in a tropical or humid climate;

The metal chassis and carriage, if provided with the requisite strength to resist mechanical shocks and impacts, as in a portable apparatus, tend to be bulky and undesirably heavy, and difficulty is experienced in providing such components with the complicated shapes required for the assembling together of all of the components of the apparatus in a compact space;

It is difficult to maintain the close tolerances required in the fabrication and assembly of the metal main chassis and carriage for achieving the desired accurate positioning of the head; and Numerous assembling steps are required for the attachment to the metal main chassis and carriage of the large numbers of other components mounted thereon, so that the cost of manufacturing the apparatus is relatively high.

SUMMARY OF THE INVENTION

Accordingly, it is an object of the present invention to reduce the manufacturing costs of tape recording and/or reproducing apparatus of the described type while ensuring that the magnetic head, in its operative position, is accurately disposed in respect of the magnetic tape contained in a cassette.

Another object is to provide an apparatus of the described type that is relatively light in weight so as to be easily portable, and in which the chassis is designed to resist and absorb impacts or mechanical shocks and thereby protect other components of the apparatus from damage due to such impacts.

In accordance with an aspect of this invention, the main chassis of the apparatus on which the tape driving mechanism and other components are mounted, and also the head plate or carriage which supports the magnetic recording and/or reproducing head and other elements, such as, a pinch roller for cooperation with the capstan of the tape driving mechanism, are molded of synthetic resins, with the synthetic resin of the molded main chassis being preferably relatively resilient for absorbing impacts and shocks, while the synthetic resin of the molded head plate or carriage is preferably relatively rigid to ensure the accurate positioning of the head relative to the tape during recording and reproducing operations.

The above, and other objects, features and advantages of the invention, will be apparent in the following detailed description of illustrative embodiments thereof which is to be read in connection with the accompanying drawings.

DESCRIPTION OF THE PREFERRED EMBODIMENTS

Figure 1:
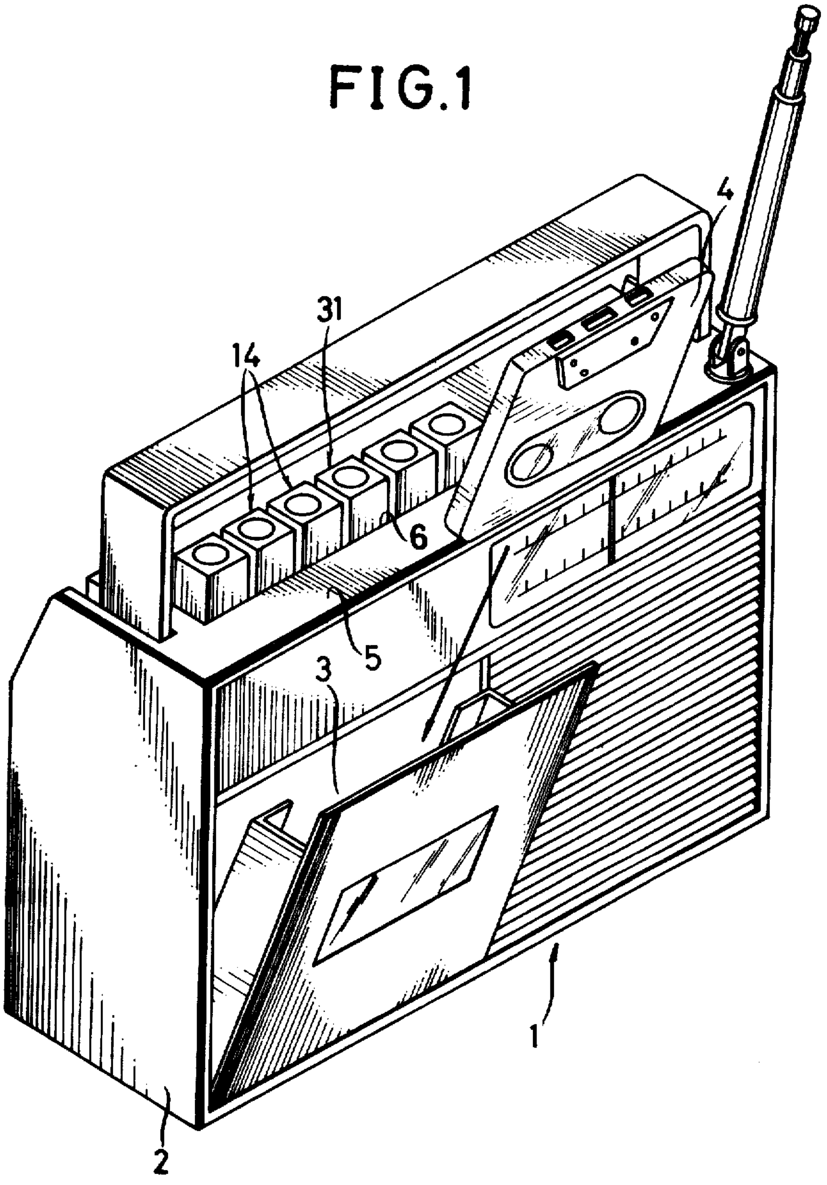
FIG. 1 is a perspective view of a tape recording and/or reproducing apparatus according to this invention embodied in a combined radio and tape recorder.

Referring initially to FIG. 1, it will be seen that the illustrated combined radio and tape recording and/or reproducing apparatus 1 in accordance with this invention generally comprises a cabinet 2 having a lid 3 that is pivotally mounted to form a portion of the cabinet wall, and that can be swung outwardly from the cabinet, as shown, to slidably receive a tape cassette 4.

Within the cabinet 2, there is fixedly secured a main chassis 11 (FIGS. 2 and 3) on which there are assembled the various elements of a tape driving mechanism, a head plate or carriage 12 which is slidable relative to main chassis 11, and the fixed frame 13 of an assembly 31 of push-buttons 14 by which the various modes of operation of the apparatus are selected. In accordance with this invention, main chassis 11, head plate or carriage 12 and at least frame 13 and pushbuttons 14 of assembly 31 are all molded of synthetic resins.

More specifically, in accordance with the present invention, main chassis 11 is molded of a synthetic resin, for example, of acrylonitrile-butadiene-styrene copolymer, hereinafter referred to as ABS resin, having sufficient elasticity to protect the tape driving mechanism and other components of the apparatus mounted thereon from mechanical shocks and impacts which are unavoidable, particularly when the tape recording and/or reproducing apparatus is intended to be portable, while the head plate or carriage 12 which is slidable on main chassis 11 is molded of a synthetic resin, for example, acrylonitrilestyrene copolymer, hereinafter referred to as AS resin, which is relatively rigid for reliably maintaining the desired positional relationship between a magnetic head or heads mounted on plate or carriage 12 and the tape driving mechanism mounted on main chassis 11, with the synthetic resin of plate 12 being of course sufficiently strong to withstand the shocks or impacts that may be transmitted through the relatively flexible or resilient main chassis 11 to the head plate.

Further, in order to obtain the most desirable characteristics of the synthetic resins of which the main chassis 11 and head plate 12 are molded, it is desirable that such resins be reinforced with fiber glass, in which case the ABS resin and the AS resin are hereinafter referred to as ABSG and ASG resins, respectively.

In an example of apparatus according to this invention, the ABSG resin of which the main chassis 11 is molded contains approximately 10% of glass fibers, based on the weight of the resin, and is hereinafter referred to as ABSG-10 resin, while the ASG resin of which the head plate 12 is molded contains approximately 20 percent of glass fibers, based on the weight of the resin, and is hereinafter referred to as ASG-20 resin. It has been found that the foregoing amounts of fiber glass results in an increase in the stiffness or Rockwell hardness of the ABSG-10 resin and ASG-20 resin to levels that are two or three times greater than that of the ABS resin and AS resin. Further, the thermal expansion coefficients of the resins including the stated amounts of fiber glass are much smaller than those of the ABS resin and AS resin, so that changes in temperature result in very much reduced variations in the relative tolerances and positional relationships of main chassis 11 and head plate 12 and of the various elements or components of the apparatus mounted thereon. The deflection temperatures, that is, the threshhold temperatures at which the molded synthetic resin commences to change its shape when heated under a certain load, of the ABSG-10 and ASG-20 resins are far higher than the corresponding characteristics of the ABS and AS resins.

It is also found that the mold shrinkage, that is, the reduction in volume of the resin as the same is molded, is reduced for the ABSG-10 and ASG-20 resins as compared with the same resins devoid of fiber glass. Further, the occurrence of sink marks, that is, the appearance of concavities in the surfaces of a molded part by reason of its rapid removal from the mold, is reduced by reason of the inclusion of the fiber glass in the described resins. Finally, the "creep," that is, the slow permanent deformation of the resin under sustained stress, is from two to five times greater for the ABS resin and the AS resin than for the ABSG-10 and ASG-20 resins.

The actual characteristics of the ABSG-10 resin and of the ASG-20 resin of which main chassis 11 and head plate or carriage 12 are respectively molded are indicated in the following table:

TABLE I

| Characteristics | | Unit | Test Condition | ASG-20 | ASBG-10 |
|---|---|---|---|---|---|
| bending strength | yield point | $kg/cm^2$ | 23°C | 1600 | 1100 |
| | elastic modulus | $kg/cm^2$ | 23° | 67000 | 45000 |
| Impact strength (Izod type impact) Dimensions of sample | | kg.cm/cm | 23°C | 5.5 | 8 |

TABLE 1 – Continued

| Characteristics | Unit | Test Condition | ASG-20 | ASBG-10 |
|---|---|---|---|---|
| 12.7 × 12.7 × 63.5 mm | | | | |
| Stiffness (Rockwell hardness) | R scale | 23°C | 125 | 115 |
| Deflection temperature under load | °C | 18.56 kg/cm² | 100 | 97 |
| Thermal expansion coefficient | cm/cm/°C | | $3.0 \times 10^{-5}$ | $5.0 \times 10^{-5}$ |
| mold shrinkage thickness (t=3mm) | | | 1/1000 ~ 4/1000 | 3/1000 ~ 4/1000 |

It will be seen from the above table that head plate or carriage 12 molded of ASG-20 resin is stiffer or more rigid than main chassis 11 molded of the ABSG-10 resin, whereas the main chassis 11 has a higher impact strength than the head plate or carriage 12.

The coefficients of linear expansion for the ABSG-10 and ASG-20 resins, and for numerous other materials are given in the following table:

TABLE 2

| Material | Coefficient of linear expansion $^{-5}$ cm/cm/c |
|---|---|
| polystyrene | 6~8 |
| AS | 6~7 |
| ABS | 7~12 |
| PP (polypropylene resin) | 6~11 |
| PC (polycarbonate resin) | 6~7 |
| PAct (polyacetal resin) | 8.4 |
| Nylon 66 | 10~15 |
| phenol | 4~6 |
| FE | 1.2 |
| Aluminum | 2.4 |
| Copper, or copper alloy | 1.7~1.9 |
| Zn-alloy | 3.0 |
| ASG20 | 2.8~3.0 |
| ABSCT 10 | 5.0 |

It will be apparent from table 2 above that the coefficients of linear expansion of the resins employed for main chassis 11 and head plate or carriage 12 are relatively low so as to ensure the dimensional stability and the maintenance of the desired relative positioning of the various components mounted on chassis 11 and head plate 12 when subjected to temperature changes. Further, it will be apparent from table 1 that the resins employed for chassis 11 and head plate have sufficient bending and impact strengths and sufficient stiffness or rigidity to resist impacts or shocks to which the apparatus is likely to be subjected, particularly when designed so as to be portable.

Since main chassis 11 and head plate or carriage 12 are molded of suitable synthetic resins, for example, as specified above, the main chassis and head plate can be easily provided with the necessary intricate shapes or configurations necessary for the compact positioning thereon of other components of the apparatus, and such molded main chassis and head plate or carriage can be provided with integral posts, studs, bushings, projections, guides and the like by which head plate 12 may be slidably mounted on main chassis 11 and other components of the apparatus may be conveniently and inexpensively mounted on the main chassis and head plate. For example, as shown on FIG. 2, main chassis 11 may be molded to provide, as integral parts thereof, a guide or channel 20, a boss 21, a locating projection 22, lugs 23 and bosses 24, while head plate 12 may be molded with integral bosses 25, projections 26 and an extension 27, for purposes hereinafter described in detail.

The tape driving mechanism of the apparatus according to this invention may be of the type disclosed in detail in U.S. Pat. Application Ser. No. 233,452, filed Mar. 10, 1972, now U.S. Pat. No. 3,779,498, and having a common assignee herewith. Since the specific tape driving mechanism forms no part of the present invention, it will be neither described nor illustrated in detail herein. However, the tape driving mechanism is shown generally to comprise a capstan 65 in the form of an elongated shaft which, as hereinafter described, is journalled in boss 21 so as to project from the latter at the side of main chassis 11 on which head plate 12 is slidably mounted, and reel shafts 66 and 67 suitably journalled in respective bosses molded on chassis 11 for engagement with tape supply and take-up reels contained within the housing of tape cassette 4. A pinch roller 68 (FIG. 3) is rotatable on a support arm that is pivotally mounted on a post integral with main chassis 11 for movement of pinch roller 68 toward and away from capstan 65, for example, by a spring (not shown) carried by head plate 12, in response to the slidable movement of head plate 12 between its operative and inoperative positions.

The bosses 25 on head plate 12 receive suitable fasteners by which a magnetic recording and/or reproducing head 69 and an erasing head 70 (FIG. 3) are secured to head plate 12, while the remaining bosses 25 and posts or projections 26 are provided on head plate 12 for the mounting of other devices (not shown) thereon.

The capstan 65 and reel shafts 66 and 67 of the tape driving mechanism are suitably driven from an electric motor 72 which is mounted on a bracket 71 molded integrally with main chassis 11, and the shaft of motor 72 drives a pulley 73 which is connected with a grooved fly wheel or pulley 74 on capstan 65 by means of a belt 75. The bosses 24 on main chassis 11 are provided to receive suitable fasteners by which the main chassis is fixedly secured within cabinet 2.

It should be noted that, by reason of the friction between rubber belt 75 and pulleys 73 and 74, an electrostatic charge is induced on capstan 65 which engages and drives the tape during a recording or reproducing operation. Such electrostatic charge on capstan 65 is, of course, undesirable and, when the main chassis 11 is molded of a non-conductive synthetic resin, as in accordance with the present invention, the electrostatic charge induced on capstan 65 cannot be discharged to ground through the main chassis. Accordingly, the apparatus embodying this invention provides an electrical connection from capstan 65 to ground or a point of reference potential on the printed circuit board (not shown) of the recording and/or reproducing apparatus.

Figure 4:
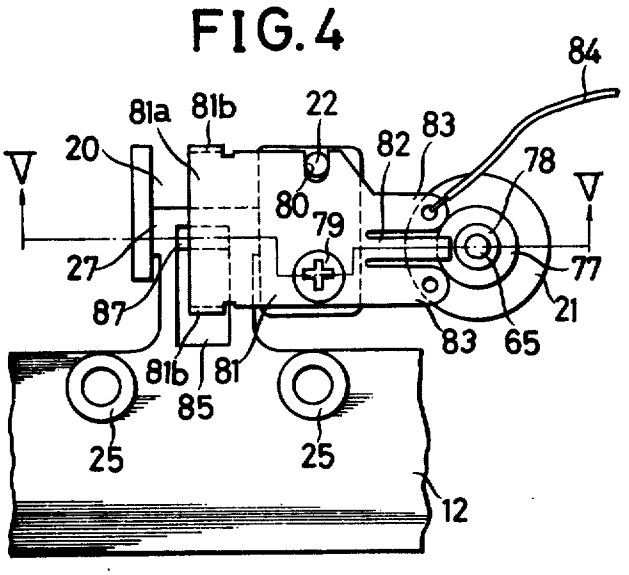
FIG. 4 is an enlarged detail view of a portion of the structure shown on FIG. 3.
Figure 5:
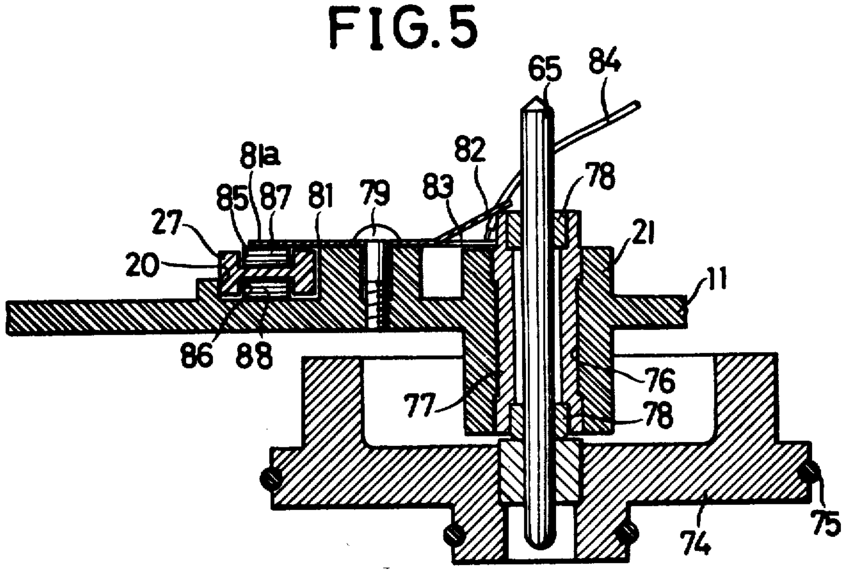
FIG. 5 is a detail sectional view taken along the line V—V on FIG. 4.

More specifically, as shown in FIGS. 4 and 5, the bore 76 of boss 21 contains a bushing 77 of conductive metal in which bearings 78 of a conductive metal alloy are retained for rotatably supporting capstan 65. A plate 81 of a resilient conductive metal is secured, as by a screw 79, on a pad molded integrally with main chassis 11 between guide 20 and boss 21. A notch 80 formed in plate 81 receives the projection 22 of the main chassis for stabilizing the positioning of plate 81. Plate 81 is formed with a resilient extension or finger 82 which bears on an end of conductive bushing 77 and thereby establishes an electrical connection with the latter. A portion 83 of conductive plate 81 is connected to one end of a wire 84 which extends to the ground or point of reference potential provided on the printed circuit board. Thus, capstan 65 is connected to ground or the point of reference potential through bearings 78, bushing 77, the resilient finger or extension 82 of conductive plate 81 and the wire 84.

Further, in accordance with this invention, the resilient plate 81 functions to stabilize head plate or carriage 12 during the movement of the latter relative to main chassis 11. More specifically, as shown on FIGS. 4 and 5, the integrally molded extension 27 of head plate 12 is laterally guided in channel or guide 20 and is formed with grooves or recesses 85 and 86 at the opposite sides of extension 27 which respectively face away from and toward chassis 11. Rollers 87 and 88 are disposed within grooves 85 and 86, and the end portion 81*a* of resilient plate 81 which is remote from finger 82 extends over groove 85 and engages roller 87 therein. Thus, roller 88 is disposed between extension 27 of head plate 12 and chassis 11, and roller 87 is disposed between extension 27 and resilient plate 81 which bears against the respective roller in the direction towards main chassis 11. By reason of the foregoing, the magnetic recording and/or reproducing head 69 which is located adjacent extension 27 is precisely located in the direction toward and away from main chassis 11 during the movement of head plate 12 to and from its operative position, and the frictional resistance to such movement of head plate 12 is reduced by means of rollers 87 and 88.

The cassette 4 intended to be used with the apparatus according to this invention is of a conventional type and, as shown on FIG. 1, has several spaced apart openings or windows in one side of its peripheral wall through which heads 69 and 70 can extend, when head plate 12 is moved to its operative position, for reproducing signals on the tape, or for erasing existing signals and recording new signals on the tape. Further, as shown on FIGS. 7 and 11, such conventional tape cassette 4 usually has its housing 4*a* provided with an opening 4*c* in its peripheral wall 4*b* at the side of the cassette remote from the windows appearing on FIG. 1. The openings 4*c* is initially obstructed by a removable tab (FIG. 11) for indicating, by its presence, that signals recorded on the tape can be erased and new signals may be recorded on the tape. However, when such tab is removed from the opening 4*c* (FIG. 7), the absence of the tab indicates that signals recorded on the tape within housing 4*a* are not to be erased. In magnetic tape recording and/or reproducing apparatus intended for use with the cassette 4, as described above, there is usually provided a detecting finger or feeler which is urged against the peripheral wall 4*b* of the cassette housing at the location of opening 4*c* for detecting the presence or absence of the removable tab. Further, it is conventional in such apparatus to provide a device by which recording operation is permitted only when the detecting finger or feeler detects the presence of the tab covering opening 4*c*.

Figure 2:
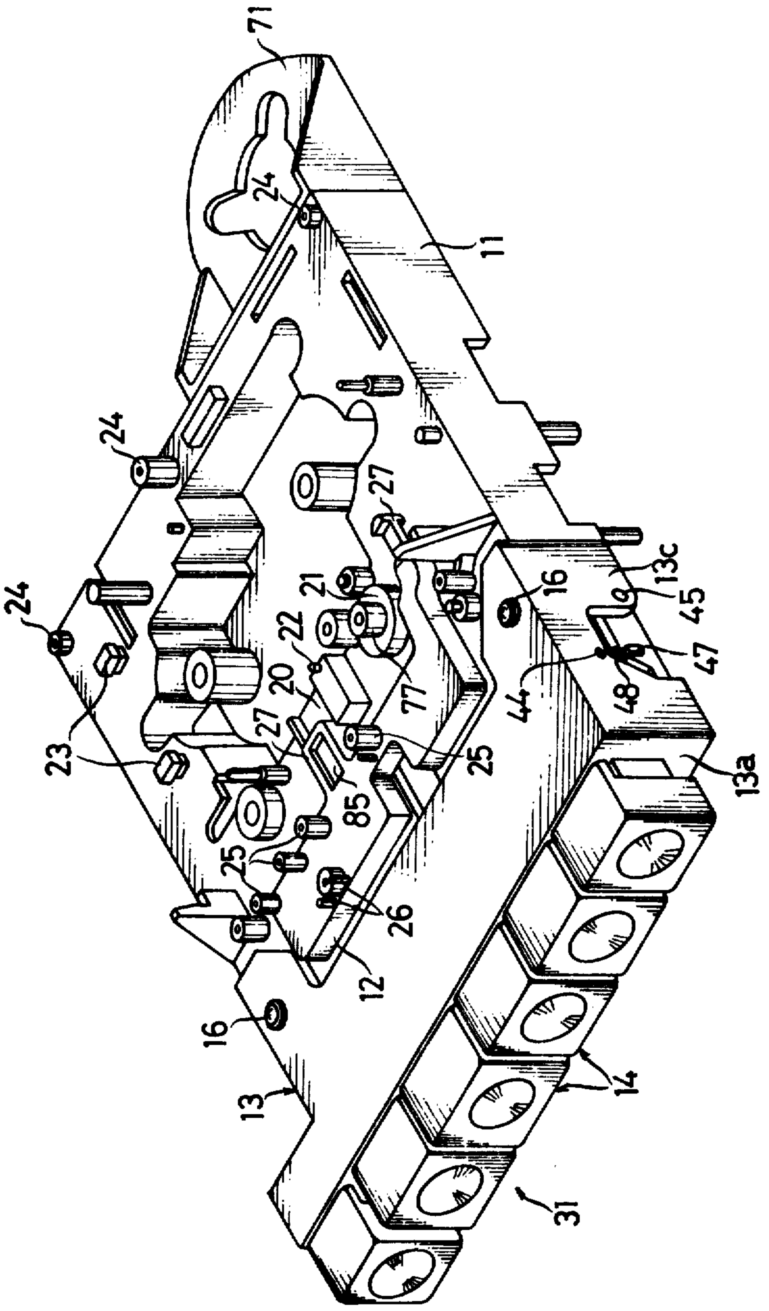
FIG. 2 is a perspective view of the main chassis of the apparatus and of the head plate and push-button assembly mounted thereon in accordance with this invention.
Figure 3:
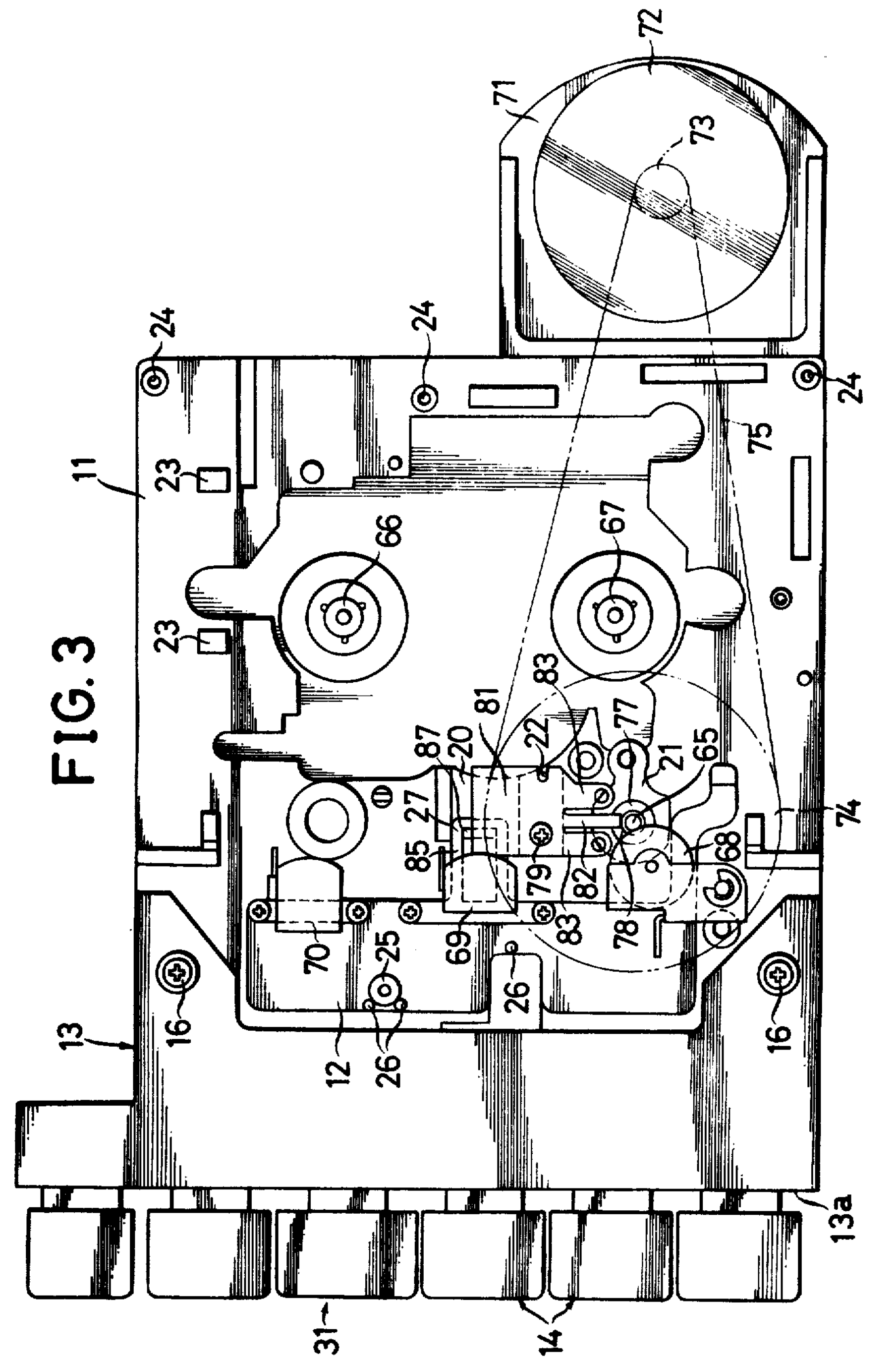
FIG. 3 is an elevational view of the assembly appearing on FIG. 2, as viewed from one side thereof.

Referring now to FIGS. 6–11, it will be seen that the detecting device in accordance with this invention includes a slide member 104 molded of a synthetic resin, for example, of a polyacetal resin, formed with a pair of elongated, longitudinally spaced apart slots 106 for slidably receiving the two guide lugs 23 molded integrally with main chassis 11 (FIG. 2). Each of guide lugs 23 is shown to be of T-shaped configuration (FIG. 8) so as to include a stem 102 and a head 101 having its end portions 23*a* and 23*b* projecting laterally beyond the stem. Each of slots 106 is shown to have a laterally enlarged portion 107 intermediate the ends of the respective slot 106 (FIG. 9) and through which head 101 of the respective lug can pass when assembling slide member 104 on main chassis 11. It will be apparent that, after head 101 has been inserted through the laterally enlarged portion 107 of the respective slot 106, stem 102 of lug 23 will engage in the respective slot 106 with a close slidable clearance, and the projecting portions 23*a* and 23*b* of head 101 will hold slide member 104 closely against main chassis 11.

Slide member 104 is further shown to include an elongated tongue or element 105 which extends longitudinally in each slot 106 and is integrally joined to the remainder of the slide member at one end of the respective slot. The elongated element 105 is shown on FIG. 7 to include successive portions 105*a* and 105*b* of progressively reduced thickness terminating in an end portion 105c that curves away from main chassis 11. By reason of the reduced thicknesses of portions 105*a*–105*c*, each elongated element 105 is resilient and acts as a spring against the respective guide lug 23 for urging slide member 104 toward the left, as viewed on FIG. 7, to a position in which the guide member 23 engages against the end of the respective slot 106 remote from that at which element 105 is attached to the remainder of slide member 104. It will be apparent that each elongated, resilient element 105 extends beyond that portion of the respective slot 106 having the lateral enlargement 107 so that, during the assembly of slide member 104 on main chassis 11, element 105 is deflected by guide lug 23 entering lateral enlargement 107, as shown on FIG. 10. Thereafter, each elongated resilient element 105 urges slide member 104 to the position shown on FIG. 7 in which the respective guide lug 23 is spaced from enlargement 107, thereby to avoid inadvertent separation of slide member 104 from the main chassis.

Figure 6:
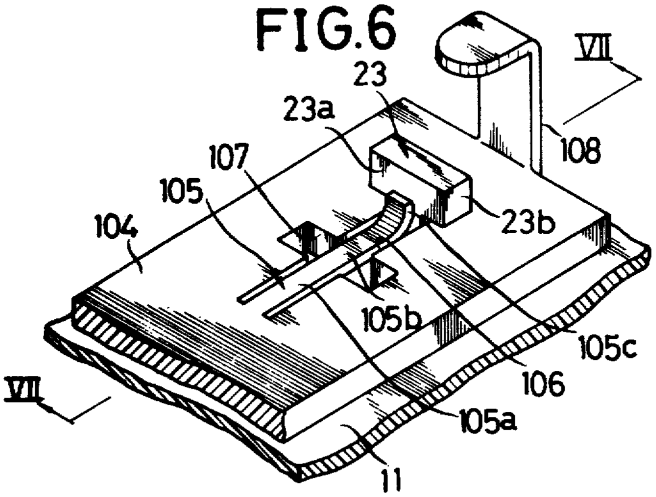
FIG. 6 is an enlarged, fragmentary perspective view of a detecting device in accordance with this invention which is mounted on the main chassis for preventing the inadvertent erasing of recorded signals.
Figure 7:
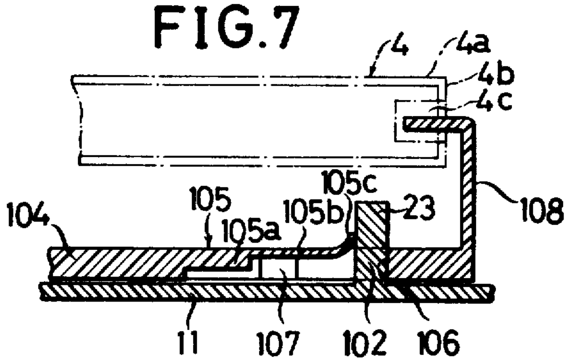
FIG. 7 is a fragmentary sectional view taken along the line VII—VII on FIG. 6.
Figure 8:
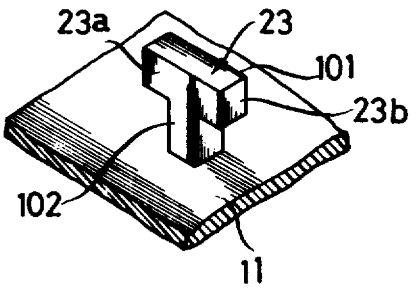
FIG. 8 is a fragmentary perspective view showing one of the lugs provided on the main chassis for the mounting thereon of the detecting device of FIG. 6.
Figure 9:
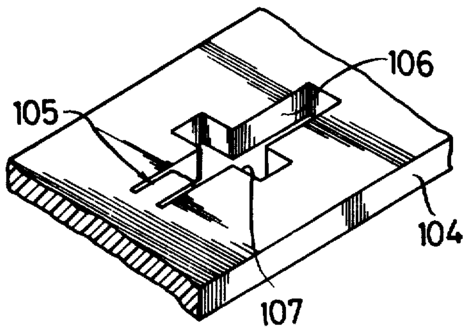
FIG. 9 is a fragmentary perspective view showing one of the slots provided in the detecting device for receiving the lug of FIG. 8.
Figure 10:
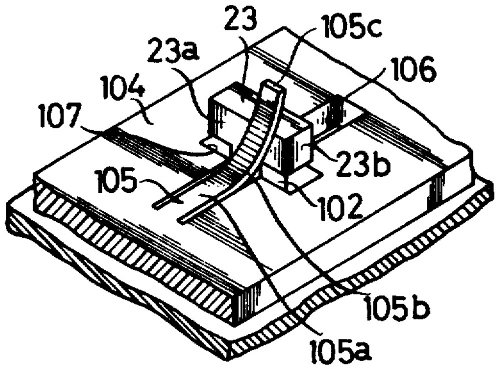
FIG. 10 is a fragmentary perspective view illustrating the relationship of the detecting device to a lug on the main chassis during the assembling of the detecting device with the main chassis.
Figure 11:
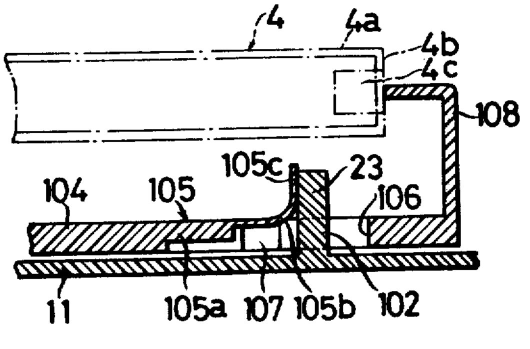
FIG. 11 is a fragmentary sectional view similar to that of FIG. 7, but illustrating the position of the detecting device when erasing and recording of signals on the tape is to be permitted.

As shown particularly on FIGS. 6,7 and 11, slide member 104 further has a detecting finger or feeler 108 molded integrally therewith, at one end, and being located and dimensioned to engage the peripheral wall 4*b* of the cassette housing 4*a* at the location of the opening 4*c* when the cassette 4 is disposed in its operative position in the recording and/or reproducing apparatus. If the tab has been removed from opening 4*c*, as on FIG. 7, slide member 104 can remain in the position to which it is urged by elongated resilient elements 105 with detecting finger or feeler 108 extending into opening 4*c*. On the other hand, if the tab has not been removed from opening 4*c*, as shown on FIG. 11, such tab on the cassette 4 displaces slide member 104 to the position shown on FIG. 11, against the resilient force of elements 105 which have their curved ends 105*c* increasingly deflected, as shown. The slide member 104 in accordance with this invention is associated with a conventional device (not shown) by which the selection of a recording operation, as by manipulation of a respective one of the push-buttons 14, is prevented when slide member 104 is in the position shown on FIG. 7. On the other hand, when slide member 104 is displaced to the position shown on FIG. 11, such conventional device permits the selection of a recording operation.

It will be apparent that the described slide member 104, in being molded as a one-piece unit complete with detecting finger or feeler 108 and resilient elements 105, substantially facilitates the production of the detecting device and its assembly on main chassis 11.

Figure 18:
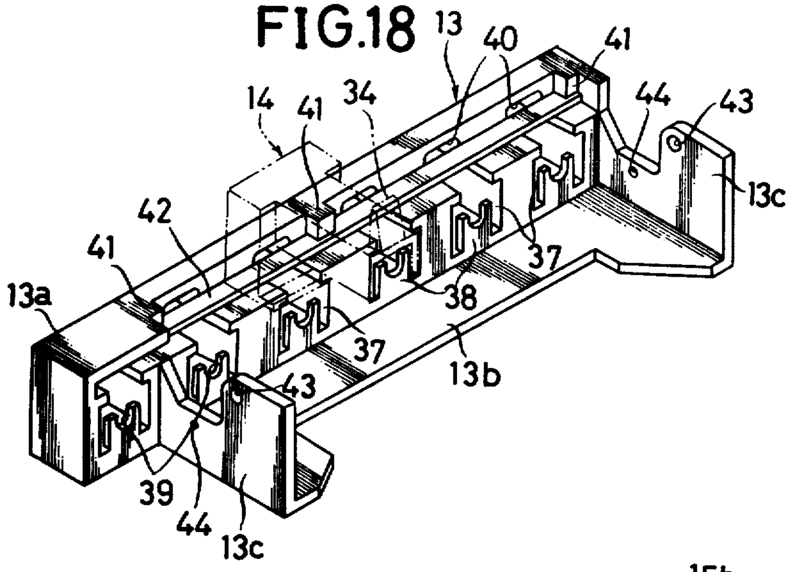
FIG. 18 is a perspective view of a molded frame included in the push-button assembly according to this invention.

Referring now to FIGS. 12–20, it will be seen that the push-button assembly 31 is shown to include six of the push-buttons 14 which, for example, may be provided respectively for effecting the fast-forward, rewinding, reproducing or playback and recording operations of the apparatus, for stopping any one of the foregoing operations, and for ejecting a cassette from its operative position within the apparatus. The molded frame 13 of synthetic resin, for example, of the previously mentioned ABSG-10 resin used for main chassis 11, includes a laterally elongated body portion 13*a* having a flange 13*b* extending therealong and end plates 13*c* at the opposite ends of flange 13*b*. Screws or other fastening means 16 (FIGS. 2 and 3) extend through suitable holes molded in flange 13*b* and are engaged in bosses molded on main chassis 11 for fixedly securing frame 13 to the latter. The body portion 13*a* of frame 13 is molded with a plurality of spaced apart parallel passageways 37 for the respective push-buttons 14, which passageways 37 open at the outer face of body portion 13*a* and have their inner ends partially closed or obstructed by generally U-shaped spring retainers 38 which are integral parts of body portion 13*a* (FIG. 18).

Figure 12:
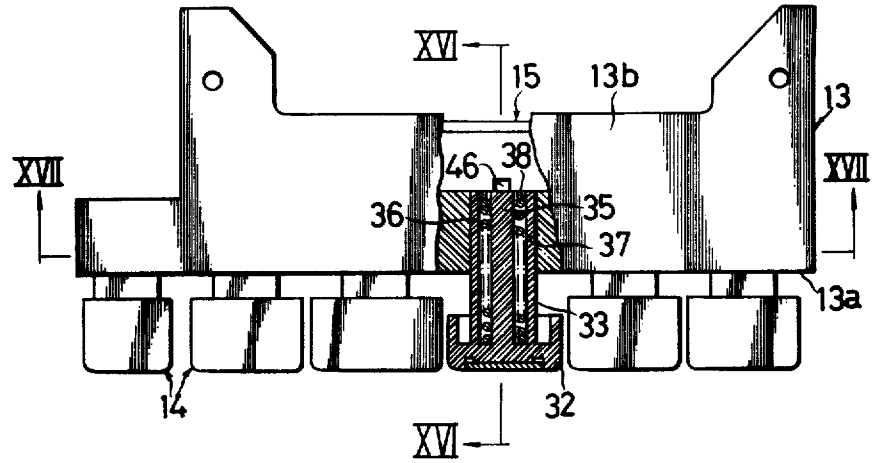
FIG. 12 is an elevational view, partly broken away and in section, of the push-button assembly provided for the tape recording and/or reproducing apparatus in accordance with this invention, and as viewed from one side thereof.
Figure 13:
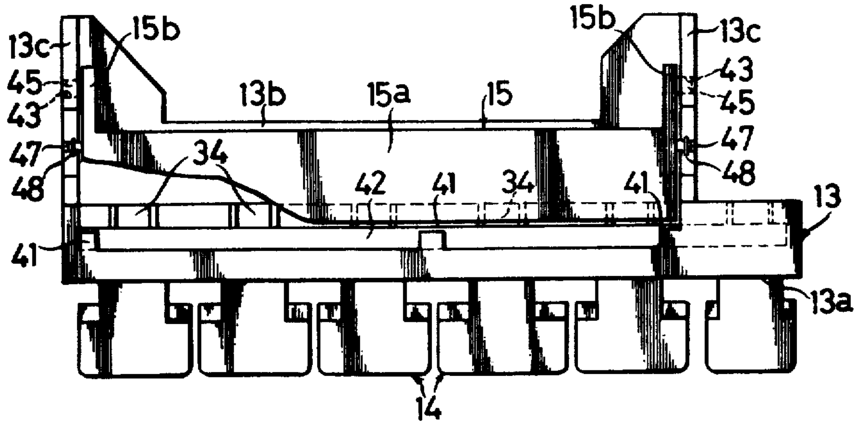
FIG. 13 is an elevational view of the push-button assembly, as viewed from the other side thereof.
Figure 14:
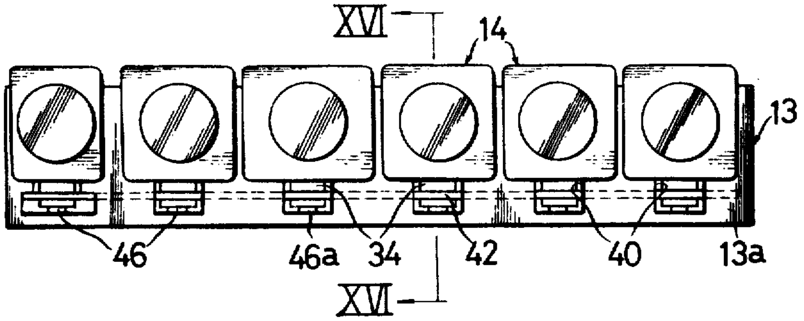
FIG. 14 is a top plan view of the push-button assembly.
Figure 15:
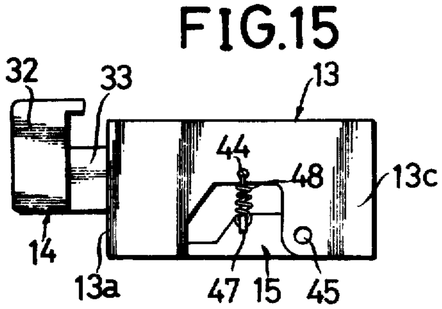
FIG. 15 is an end elevational view of the push-button assembly.
Figure 16:
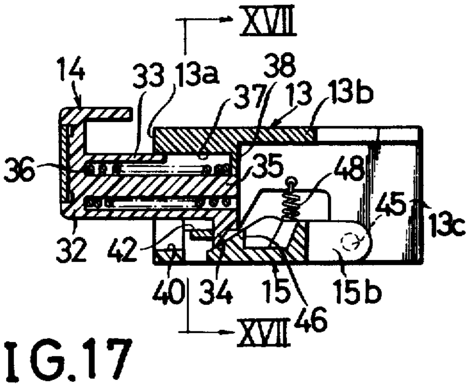
FIG. 16 is a transverse sectional view taken along the line XVI—XVI on FIG. 14.
Figure 17:
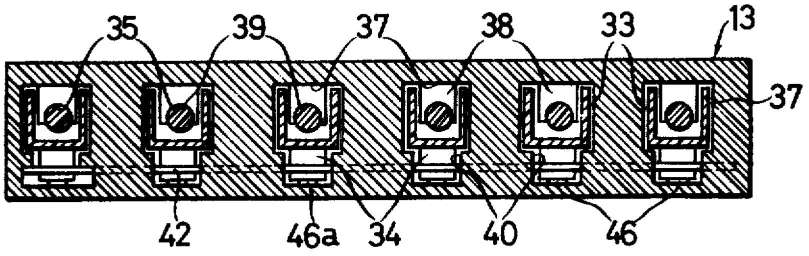
FIG. 17 is a longitudinal sectional view taken along the line XVII—XVII on FIG. 16.
Figures 19, 20:
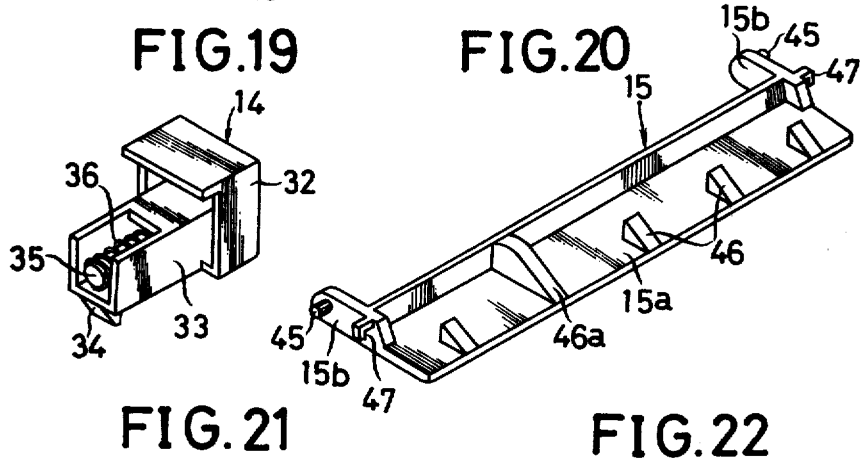
FIG. 19 is a detail perspective view of one of the push-buttons.
FIG. 20 is a perspective view of a molded locking plate that is included in the push-button assembly according to this invention.

Each of the push-buttons 14 is molded of synthetic resin, for example, of the previously mentioned ABSG-10 resin, and is shown on FIGS. 12, 16 and 19, to include a head portion 32 at the outer end of a hollow body portion 33 which is dimensioned to be slidable in the respective passageway 37. Further, each pushbutton 14 includes, as integral parts thereof, an external projection 34 at the inner end of hollow body 33, and a rod 35 extending longitudinally within hollow body 33 and serving as a holder for a helical compression spring 36 thereon. When each push-button 14 is being assembled in frame 13, the hollow body 33 is slidably inserted into the respective passageway 37 through the outer end of the latter, and the projection 34 on hollow body 33 then passes through an enlargement 40 (FIG. 18) provided at the side of passageway 37 away from flange 13*b*. Upon such insertion of hollow body 33 into passageway 37, the inner end of spring holder 35 is slidably received in the semicircular recess 39 defined by the respective spring retainer 38 while the adjacent end of spring 36 bears against such spring retainer. Thus, the spring 36 associated with each push-button 14 is effective, at all times, to urge the pushbutton outwardly to its inoperative position with respect to frame 13. In order to prevent the ejection of push-buttons 14 from frame 13 following the assembly with the latter, a cross member or bar 42 is installed on frame 13 (FIGS. 13, 14, 16 and 18) and secured in place by heat and pressure deformable lugs 41, so that cross-member or bar 42 will extend across and block the enlargements 40 of passageways 37. Thus, after push-buttons 14 are assembled with frame 13 and cross member or bar 42 is installed, the outwardly facing shoulders defined by external projections 34 will be engageable with bar 42 for limiting the outward movements of push-buttons 14 under the urging of the respective springs 36.

It will be apparent that, when a selected one of push-buttons 14 is depressed, the inner end of its hollow body 33 will extend inwardly from the respective passageway 37 about spring retainer 38 and be engageable with respective links or levers (not shown) of the tape driving mechanism for selecting the respective operating mode of the apparatus. When one of the push-buttons 14 is depressed to select the fast-forward, rewinding, recording or playback mode of operation, it is desired that such push-button be retained in its depressed position so as to continue the selected mode of operation for as long as desired, for example, until the "stop" push-button is depressed. In order to achieve the foregoing, the push-button assembly 31 in accordance with this invention further includes a molded locking plate 15 of synthetic resin, for example, of the previously mentioned ASG-20 resin used for head plate 12. The molded locking plate 15 (FIGS. 13, 15, 16 and 20) is shown to include a laterally elongated substantially flat portion 15*a* having arms 15*b* extending from its opposite ends and formed with laterally directed, integral pins 45 which are engageable in holes 43 molded in the side plates or flanges 13*c* of frame 13. The flat portion 15*a* of locking plate 15 is further molded with sloping ramps 46 and 46*a* (FIG. 20) extending from the free longitudinal edge of flat portion 15*a* at laterally spaced apart locations corresponding to the locations of the external projections 34 of push-buttons 14 installed in frame 13. The ramps 46 to be associated with the push-buttons 14 for selecting the fast-forward, rewinding, play-back and recording modes of operation terminate in shoulders substantially perpendicular to flat portion 15*a*, while the ramp 46*a* which is associated with the push-button for stopping any of the preceding modes of operation extends beyond the shoulders of ramps 46 to an edge flange extending along flat portion 15*a* between arms 15*b*. Molded locking plate 15 is further provided with integral lugs 47 at its opposite ends and, upon assembling locking plate 15 with frame 13, helical tension springs 48 (FIGS. 15 and 16) are connected between lugs 47 and holes 44 molded in the adjacent flanges or side plates 13*c* of frame 13 so that springs 48 urge locking plate 15 upwardly, as viewed on FIGS. 15 and 16, for engaging ramps 46 and 46*a* against the external projections 34 on the respective push-buttons 14. Further, it will be seen that the surface of each projection 34 leading to the respective shoulder is raked or sloped in the same direction as the respective ramp 46 or 46*a*.

Accordingly, when any one of the push-buttons 14 for selecting the fast-forward, rewinding, playback or recording mode of operation is depressed, its external projection 34 rides on the respective ramp 46 of locking plate 15 and deflects the latter until the shoulder defined by projection 34 engages the shoulder defined by the respective ramp 46 and is held in such engagement by the springs 48 acting on locking plate 15. Thus, the selected push-button 14 is held in its depressed condition to continue the selected mode of operation. However, when the "stop" push-button 14 is depressed, its projection 34 rides on the ramp 46*a* to pivotally deflect locking plate 15 and thereby release the projection 34 of any previously depressed pushbutton from the shoulder of the respective ramp 46. Since ramp 46*a* is continuous, that is, does not define a retaining shoulder, the "stop" push-button 14 returns automatically to its extended position upon being released.

Figure 21:
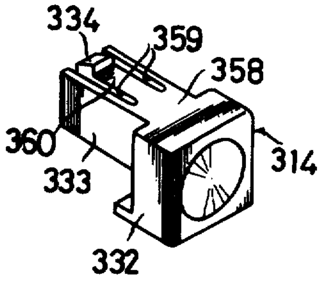
FIG. 21 is a detail perspective view of a push-button in accordance with another embodiment of this invention.
Figure 22:
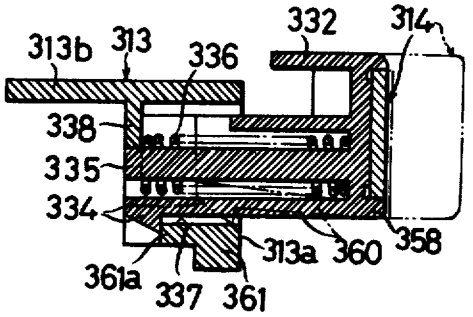
FIG. 22 is a sectional view generally similar to that of FIG. 16, but in which the push-button of FIG. 21 is employed.

Referring now to FIGS. 21 and 22 in which a push-button 314 in accordance with another embodiment of this invention is illustrated, it will be seen that such push-button is generally similar to the previously described push-button 14 and is molded to include an enlarged head 332 at the outer end of a hollow body 333 which is formed with an external projection 334 at its inner end. However, in this embodiment, the wall 358 of hollow body 333 has a pair of spaced apart slots 359 extending from the inner end of the hollow body to define a resilient tongue 360 between such slots 359, with the external projection 334 being formed at the free end of the resilient tongue 360. As before, push-button 314 is molded with a longitudinal bar 335 within its hollow body 333 to act as a holder for the helical compression spring 336 which bears, at its inner end, against the U-shaped spring retainer 338 molded so as to partly obstruct the inner end of the respective passageway 337 in the body portion 313*a* of frame 313.

When the above described push-button 314 is initially installed or assembled with frame 313 by the insertion of its hollow body 333 into the respective passageway 337, the raked surface of external projection 334 rides against the wall 361 of the frame body portion 313*a* and resilient tongue 360 is flexed out of the plane of wall 358 until projection 334 exits at the inner end of passageway 337 to permit return of tongue 360 to its original position. In such original position of tongue 360, the shoulder defined by projection 334 is engageable against the edge surface 361*a* of wall 361, as shown on FIG. 22, thereby to prevent the ejection of pushbutton 314 from its assembled condition with frame 313. It will be apparent that, with the construction of the push-buttons illustrated on FIGS. 21 and 22, the previously referred to retaining bar 42 appearing on FIGS. 13, 16 and 18 can be omitted.

It will be apparent that, in the magnetic tape recording and/or reproducing apparatus according to this invention, the main chassis 11, head plate 12, detecting device 104–108 and the push-button assembly 31 are conveniently molded of synthetic resins so as to greatly facilitate the fabrication and assembly of such components and of other parts of the apparatus for greatly reducing the cost thereof.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined in the appended claims.

What is claimed is:

1. In a tape recording and/or reproducing apparatus having a tape driving mechanism that includes reel shafts for engagement with tape supply and take-up reels, a capstan and a motor for driving the reel shafts and capstan, and a magnetic head for selectively recording and/or reproducing signals on the tape as the latter is transported between the supply an take-up reels by means of the capstan; a main molded chassis of synthetic resin having said tape driving mechanism mounted thereon, and a molded carriage of synthetic resin having at least said magnetic head fixed thereon and being slidably mounted on said main molded chassis for selectively disposing said head in an operative position in respect of the tape between the supply and take-up reels.

2. A tape recording and/or reproducing apparatus according to claim 1, in which the synthetic resins of said main chassis and said carriage, respectively, have different hardnesses.

3. A tape recording and/or reproducing apparatus according to claim 1, in which circuit means are provided for operating said magnetic head in the recording and/or reproducing modes thereof and include a point of reference potential, and further comprising conductive means for electrically connecting said capstan with said point of reference potential, whereby to avoid the build-up of a static charge on said capstan.

4. A tape recording and/or reproducing apparatus according to claim 1, in which said molded carriage has an integral extension adjacent said magnetic head with recesses in the opposite surfaces of said extension facing toward and away from said main chassis, a friction reducing roller is disposed in each of said recesses, and a plate is secured on said main chassis adjacent said extension and extends over said recess facing away from said main chassis for engaging the roller therein and urging the extension toward said main chassis.

5. A tape recording and/or reproducing apparatus according to claim 1, in which a push button assembly is provided for selectively initiating various modes of operation of said apparatus, and said push button assembly includes a molded frame of synthetic resin secured on said molded main chassis and having a plurality of spaced apart parallel passageways formed therethrough with an integral spring retainer partially obstructing the inner end of each of said passageways, a molded push button of synthetic resin for each of said passageways including a hollow body portion slidable in the respective passageway past said spring retainer, a head portion at the outer end of said body portion adapted to be manually depressed for selecting a respective mode of operation and an external projection on said hollow body adjacent the inner end thereof, a spring within said hollow body of each of said push buttons engaging the respective spring retainer for urging the push button to an inoperative projecting position in respect to said frame, and means on said frame engageable by said external projection on each of said push buttons after the insertion of said hollow body thereof into the respective passageway for blocking the ejection of said hollow body from said passageway by the action of said respective spring.

6. A tape recording and/or reproducing apparatus according to claim 5, in which said means engageable with said external projection on each hollow body is constituted by a bar secured on said frame so as to extend across the inner ends of said passageways.

7. In a tape recording and/or reproducing apparatus having a tape driving mechanism that includes reel shafts for engagement with tape supply and take-up reels, a capstan and a motor for driving the reel shafts and capstan, and a magnetic head for selectively recording and/or reproducing signals on the tape as the latter is transported between the supply and take-up reels by means of the capstan; a main molded chassis of synthetic resin having said tape driving mechanism mounted thereon, said synthetic resin of the molded main chassis being relatively resilient for absorbing impacts and shocks, and a molded carriage of synthetic resin having at least said magnetic head fixed thereon and being slidably mounted on said main molded chassis for selectively disposing said head in an operative position in respect of the tape between the supply and take-up reels, said synthetic resin of the molded carriage being relatively rigid to ensure the accurate positioning of said head relative to the tape in said operative position.

8. A tape recording and/or reproducing apparatus according to claim 7, in which said relatively resilient resin of the molded main chassis is an acrylonitrile-butadienestyrene copolymer, and said relatively rigid resin of the molded carriage is an acrylonitrile-styrene copolymer.

9. A tape recording and/or reproducing apparatus according to claim 8, in which each of said relatively resilient and relatively rigid resins is reinforced with glass fibers.

10. A tape recording and/or reproducing apparatus according to claim 8, in which said acrylonitrile-butadienestyrene copolymer is reinforced with glass fibers in an amount substantially equal to 10% of the weight of said acrylonitrilebutadiene-styrene copolymer, and said acrylonitrile-styrene copolymer is reinforced with glass fibers in an amount substantially equal to about 20% of the weight of said acrylonitrile-styrene copolymer.

11. A tape recording and/or reproducing apparatus according to claim 7, in which circuit means are provided for operating said magnetic head in the recording and/or reproducing modes thereof and include a point of reference potential, and further comprising conductive means for electrically connecting said capstan with said point of reference potential, whereby to avoid the build-up of a static charge on said capstan.

12. In a tape recording and/or reproducing apparatus having a tape driving mechanism that includes reel shafts for engagement with tape supply and take-up reels, a capstan and a motor for driving the reel shafts and capstan, and a magnetic head for selectively recording and/or reproducing signals on the tape as the latter is transported between the supply and take-up reels by means of the capstan; a main molded chassis of synthetic resin having said tape driving mechanism mounted thereon; a molded carriage of synthetic resin having at least said magnetic head fixed thereon and being slidably mounted on said main molded chassis for selectively disposing said head in an operative position in respect of the tape between the supply and take-up reels; circuit means for operating said magnetic head in the recording and/or reproducing modes thereof and including a point of reference potential, whereby to avoid the build up of a static charge on said capstan; said conductive means includes a conductive bearing bushing mounted in said molded main chassis and in which said capstan is rotatable, a conductive plate mounted on said molded main chassis and having a resilient extension bearing against an end of said conductive bearing bushing, and an electrical connection between said conductive plate and said point of reference potential.

13. A tape recording and/or reproducing apparatus according to claim 12, in which said molded carriage has an integral extension with recesses at the sides thereof facing toward and away from said main chassis, friction reducing rollers are disposed in said recesses, and said conductive plate extends over said recess facing away from said main chassis and engages the roller therein for urging said extension toward said main chassis.

14. A tape recording and/or reproducing apparatus according to claim 13, in which said conductive plate has a tab extending therefrom into said recess facing away from the main chassis for retaining the respective roller in such recess.

15. In a tape recording and/or reproducing apparatus having a tape driving mechanism that includes reel shafts for engagement with tape supply and take-up reels, a capstan and a motor for driving the reel shafts and capstan, and a magnetic head for selectively recording and/or reproducing signals on the tape as the latter is transported between the supply and take-up reels by means of the capstan; a main molded chassis of synthetic resin having said tape driving mechanism mounted thereon; a molded carriage of synthetic resin having at least said magnetic head fixed thereon and being slidably mounted on said main molded chassis for selectively disposing said head in an operative position with respect of the tape between the supply and take-up reels; and in which a push button assembly is provided on said main chassis for selectively initiating modes of operation of the apparatus including recording and reproducing operations, the tape supply and take-up reels are contained in a cassette housing adapted to be fixedly positioned in respect of said main chassis and having an opening with a removable tab initially extending in said opening for indicating, by its presence, that recording of signals on the tape in said housing is permitted, a molded slide member of synthetic resin has spaced elongated slots therein receiving guide lugs integral with said molded main chassis for slidably guiding said slide member on said chassis between first and second positions at which said slide member respectively prevents and permits selection of the recording operation, a detecting finger extends integrally from said slide member so as to be engageable, in said first position, in said opening of a cassette positioned in respect to said chassis, and an elongated, reduced thickness resilient element is molded integrally with said slide member and extends into one of said slots for engagement with the respective one of said guide lugs so as to bias said slide member to said first position.

16. A tape recording and/or reproducing apparatus according to claim 15, in which said resilient element has an arcuate end portion engaging said one guide lug.

17. A tape recording and/or reproducing apparatus according to claim 15, in which each of said guide lugs is of T-shaped configuration so as to have a stem slidable in the respective slot and a laterally enlarged head for holding said slide member against said chassis, and each of said slots has a laterally enlarged portion disposed to permit the passage of said head of the respective guide lug therethrough when said slidemember is displaced beyond said second position.

18. In a tape recording and/or reproducing apparatus having a tape driving mechanism that includes reel shafts for engagement with tape supply and take-up reels, a capstan and a motor for driving the reel shafts and capstan, and a magnetic head for selectively recording and/or reproducing signals on the tape as the latter is transported between the supply and take-up reels by means of the capstan; a main molded chassis of synthetic resin having said tape driving mechanism mounted thereon; a molded carriage of synthetic resin having at least said magnetic head fixed thereon and being slidably mounted on said main molded chassis for selectively disposing said head in an operative position in respect of the tape between the supply and take-up reels; and in which a push button assembly is provided for selectively initiating various modes of operation of said apparatus, said push button assembly includes a molded frame of synthetic resin secured on said molded main chassis and having a plurality of spaced apart parallel passageways formed therethrough with an integral spring retainer partially obstructing the inner end of each of said passageways, a molded push button of synthetic resin for each of said passageways including a hollow body portion slidable in the respective passagway past said spring retainer, a head portion at the outer end of said body portion adapted to be manually depressed for selecting a respective mode of operation and an external projection on said hollow body adjacent the inner end thereof, a spring within said hollow body of each of said push buttons engaging the respective spring retainer for urging the push button to an inoperative projecting position in respect of said frame, and means on said frame engageable by said external projection on each of said push buttons after the insertion of said hollow body thereof into the respective passageway for blocking the ejection of said hollow body from said passageway by the action of said respective spring, said hollow body of each push button has a pair of spaced slots defining a resilient tongue therebetween on which said external projection is positioned, said external projection has a raked surface leading to a shoulder which, during insertion of said hollow body into said passageway, causes said tongue to flex, and said means engageable with said external projection includes a surface on said frame at the inner end of each of said passageways adapted to be contacted by said shoulder of the respective projection after the latter emerges from the inner end of said passageway.

19. In a tape recording and/or reproducing apparatus having a tape driving mechanism that includes reel shafts for engagement with tape supply and take-up reels, a capstan and a motor for driving the reel shafts and capstan, and a magnetic head for selectively recording and/or reproducing signals on the tape as the latter is transported between the supply and take-up reels by means of the capstan; a main molded chassis of synthetic resin having said tape driving mechanism mounted thereon, and a molded carriage of synthetic resin having at least said magnetic head fixed thereon and being slidably mounted on said main molded chassis for selectively disposing said head in a operative position in respect of the tape between the supply and take-up reels; and in which a push button assembly is provided for selectively initiating various modes of operation of said apparatus, and said push button assembly includes a molded frame of synthetic resin secured on said molded main chassis and having a plurality of spaced apart parallel passageways formed therethrough with an integral spring retainer partially obstructing the inner end of each of said passageways, a molded push button of synthetic resin for each of said passageways including a hollow body portion slidable in the respective passageway past said spring retainer, a head portion at the outer end of said body portion adapted to be manually depressed for selecting a respective mode of operation and an external projection on said hollow body adjacent the inner end thereof, a spring within said hollow body of each of said push buttons engaging the respective spring retainer for urging the push button to an inoperative projecting position in respect of said frame, and means on said frame engageable by said external projection on each of said push buttons after the insertion of said hollow body thereof into the respective passageway for blocking the ejection of said hollow body from said passageway by the action of said respective spring; and wherein each said external projection has a raked surace leading to a shoulder, a molded locking plate of synthetic resin is pivoted on said molded main chassis and resiliently urged against the inner end portions of said hollow bodies, a sloping ramp is molded integrally on said locking plate for each of said push buttons and is slidably engageable by said raked surface of the respective external projection when the respective push button is depressed, and at least certain of the sloping ramps lead to respective shoulders each engageable by said shoulder of the respective projection for retaining the push button in a depressed position.

* * * * *